(12) United States Patent
Pularikkal et al.

(10) Patent No.: US 7,916,644 B2
(45) Date of Patent: Mar. 29, 2011

(54) DYNAMIC ALLOCATION OF UPSTREAM CHANNEL RESOURCES AMONG MULTIPLE RF DOMAINS

(75) Inventors: Gangadharan Byju Pularikkal, Morrisville, NC (US); Che-Ming Chang, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 392 days.

(21) Appl. No.: 12/028,510

(22) Filed: Feb. 8, 2008

(65) Prior Publication Data

US 2009/0205004 A1    Aug. 13, 2009

(51) Int. Cl.
*H04J 3/14* (2006.01)
*H04L 12/28* (2006.01)
*H04N 7/173* (2006.01)

(52) U.S. Cl. .......... 370/235; 370/431; 370/468; 725/95; 725/111

(58) Field of Classification Search .......... None
See application file for complete search history.

(56) References Cited

U.S. PATENT DOCUMENTS

| 7,085,287 | B1 * | 8/2006 | Chapman | 370/468 |
| 7,085,306 | B1 * | 8/2006 | Voldman et al. | 375/132 |
| 7,480,237 | B2 * | 1/2009 | Nolle et al. | 370/229 |
| 7,548,558 | B2 * | 6/2009 | Rakib et al. | 370/466 |
| 2003/0177502 | A1 * | 9/2003 | Kolze et al. | 725/111 |
| 2009/0113510 | A1 * | 4/2009 | Knutson et al. | 725/127 |

* cited by examiner

*Primary Examiner* — Pankaj Kumar
*Assistant Examiner* — Marcus R Smith
(74) *Attorney, Agent, or Firm* — Patent Capital Group (57) ABSTRACT

In one embodiment, an "upstream resource pool" may be defined, such that certain upstream resources may be utilized, or not, depending on current traffic demands. Such a pool may include a specified number of available upstream channels. A universe of "eligible" RF domains may be associated with the pool. To provide additional capacity when traffic demands warrant it, an eligible RF domain may be enabled to request one or more upstream channels from the pool. A channel may be requested for a specified duration, or for an unspecified period of time.

20 Claims, 5 Drawing Sheets router(config)#interface cable 5/0/0
router(config-if)#cable upstream ports fixed 2 floating 4
router(config)#interface cable 5/0/1
router(config-if)#cable upstream ports fixed 2 floating 4

FIG. 1 interface Cable5/0/0
cable upstream 0 channel-mode fixed
 cable upstream 0 connector 0
 cable upstream 0 frequency 20000000
 cable upstream 0 channel-width 3200000 3200000
 cable upstream 0 minislot-size 4
 cable upstream 0 power-level 0
 cable upstream 0 range-backoff 3 6
 cable upstream 0 modulation-profile 23
 cable upstream 0 load-balance group 1
 no cable upstream 0 shutdown
cable upstream 2 channel-mode floating priority 1 resource-pool 1
 no cable upstream 2 connector
cable upstream 2 frequency 20000000
 cable upstream 2 channel-width 3200000 3200000
 cable upstream 2 minislot-size 4
 cable upstream 2 power-level 0
 cable upstream 2 range-backoff 3 6
 cable upstream 2 modulation-profile 23
 cable upstream 2 load-balance group 1
 no cable upstream 2 shutdown

FIG. 2 router(config)#upstream channel-pool 1
router(config)#cable slot 5/0
config(up-chan-pool)#common-resource channel 0 connector 2 ,3 priority 1
config(up-chan-pool)#common-resource channel 1 connector 2 ,3 priority 1
config(up-chan-pool)#common-resource channel 2 connector 6 ,7 priority 1
config(up-chan-pool)#common-resource channel 3 connector 6 ,7 priority 1

FIG. 3

"show upstream resource-pool all"
"show upstream resource-pool 1"
"show resource-pool 1 allocation summary"
"show interface cable x//y/z floating upstreams summary"

DYNAMIC ALLOCATION OF UPSTREAM CHANNEL RESOURCES AMONG MULTIPLE RF DOMAINS

TECHNICAL FIELD

The present disclosure relates generally to defining upstream channel resource pools and dynamically allocating upstream channel resources from such pools among multiple radiofrequency domains based on current traffic demands.

BACKGROUND

Certain cable modem termination systems (CMTSs) currently support optimized use of downstream ("DS") and upstream ("US") channel resources through the cable load balancing feature. Typically, with US load balancing, the system will try to balance the load among a number of pre-assigned US channels for a given radiofrequency ("RF") domain. If a combination of US and DS load balancing is in use, then all the RF domains that are part of the same load balance group must be available on a shared RF plant. Currently, the number of US channels assigned to an RF domain is statically configured, either by keeping the default value (typically, four channels per domain) or by assigning a variable number of US channels per domain by configuring virtual interfaces.

Through effective traffic engineering and capacity planning, multiple cable-system operators ("MSOs") might be able to predict future subscriber growth and the corresponding increase in traffic rates per fiber node, and increase accordingly the upstream channels per RF domain in order to make sure that the use of available resources is optimized. However, it takes considerable effort to realize such capacity planning, and sometimes the unforeseen growth patterns could happen for different market segments. As a result, the node split or cable re-arrangement on the RF side may be required to accommodate demand for higher bandwidths.

Further, different segments might exhibit different traffic usage patterns at different times of the day or even during different days of the week. For example, if, for a particular RF domain, the number of business subscribers is much higher than the number of residential subscribers, it may be that the traffic rates during business hours would be much higher than during non-business hours. Consequently, the optimum number of US channels required for this RF domain during daytime hours might be four, while during nighttime hours it might be two. Conversely, if there were another RF domain with a significantly higher number of residential subscribers than business subscribers, it may be that the traffic rate during evening hours would be much higher than that during daytime hours. The optimum number of US channels required for this RF domain during daytime hours might be two, while during nighttime hours it might be four. For better utilization of US channels, it would be desirable if there were an automated mechanism available to dynamically allocate upstream channel resources between RF domains depending on their current traffic loads.

In another scenario, a short term increase in bandwidth requirements on one or more fiber nodes serving one or more geographic neighborhoods might be desirable. An example of such a scenario might be a televised contest wherein viewers are invited to call in and vote for their favorite contestant. It is very likely that there will be significantly high volumes of calls from the neighborhoods in which the contestants live, as their neighbors all call in at once to vote for their local candidate. One way to address this temporary bandwidth requirement would be to add another channel, which may require cabling changes as well as manual configuration changes. Also, such additional resources would be held up indefinitely for this temporary condition. And, afterward, more manual intervention, including cabling changes, may be required to remove the additional channel. If an automated mechanism were in place to add an upstream channel on demand to an RF domain, this temporary increase in bandwidth requirement could be accomplished without such cabling changes and configuration modifications.

SUMMARY

As described herein, an "upstream resource pool" may be defined, such that certain upstream resources may be utilized, or not, depending on current traffic demands. Such a pool may include a specified number of available upstream channels. A universe of "eligible" RF domains may be associated with the pool. To provide additional capacity when traffic demands warrant it, an eligible RF domain may be enabled to request one or more upstream channels from the pool. A channel may be requested for a specified duration, or for an unspecified period of time.

For example, by default, each of the five DS channels of the 5×20 line card is associated with four upstream channels, thereby providing five (1 DS×4 US) RF domains. To allocate channels for an upstream resource pool, the initial number of upstream channels associated with the RF domains may be reconfigured. Each RF domain may be configured with a first number, N, of fixed channels, and a second number, M, of floating channels. Thus, the maximum number of channels the domain could have will be N+M. This can be defined by modifying the max-ports command for the virtual interfaces.

Floating channels may remain inactive unless and until physical channels are associated with them through a resource request. A floating channel may become operational as soon as a physical channel resource is allocated to it. Each floating channel may be assigned a "priority" setting. The higher the priority setting assigned to a floating channel, the better the chance that that floating channel will get a physical channel resource allocated to it.

DESCRIPTION OF EXAMPLE EMBODIMENTS

Currently, cable modems are known to operate in DOCSIS 1.0, DOCSIS 1.1, DOCISIS 2.0, and DOCSIS 3.0 modes. DOCSIS, which stands for Data Over Cable Service Interface Specifications, provides methods for transporting data over a cable plant (e.g., the physical infrastructure (wire, connectors, cables, etc.) used to carry data communications signals between data communications equipment on a network). Such a cable plant may utilize QAM and/or QPSK RF modulation.

A cable modem termination system (CMTS) may include any number of cable line cards. A cable line card may be configured to provide an interface between a cable network and another network, such as a digital network, for example. One function of a conventional line card is to convert one type of data signal into another type of data signal so that two different types of networks may communicate with each other. For example, a typical cable line card may convert modulated RF signals into data packets and vice versa. That is, the cable line card may format data extracted from a modulated RF signal into one or more data packets, and data extracted from one or more data packets into a modulated RF signal.

For illustrative purposes, the invention is described herein with reference to 5×20 cable line cards. By default, in a 5×20 line card, each of five DS channels is associated with four US channels, thereby providing five RF domains, each having one DS channel and four US channels. It should be understood, however, that the invention is in no way limited to 5×20 line cards.

As described herein, an "upstream resource pool" may be defined. In order to allocate channels for the upstream resource pool, the initial number of upstream channels associated with the RF domains may be reconfigured. This can be accomplished by means of the virtual interface configuration. Each RF domain may be configured with a first number, N, of fixed channels, and a second number, M, of floating channels. Thus, the maximum number of channels the domain could have will be N+M. This can be defined by modifying the max-ports command for the virtual interfaces.

Figure 1:
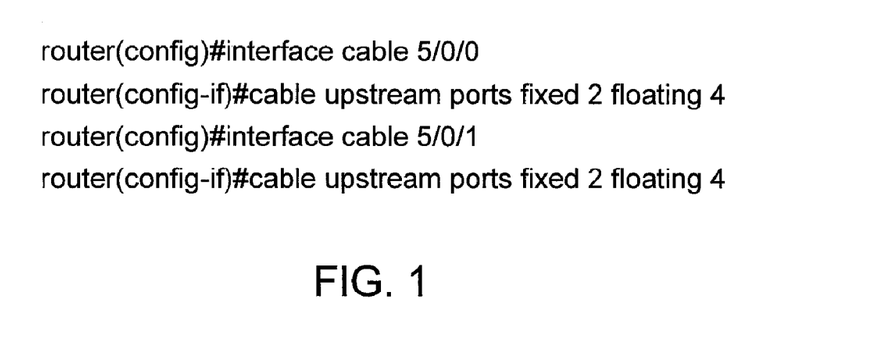
FIG. 1 provides an example virtual interface configuration.

For example, assume that each domain is to be configured with two fixed channels and four floating channels so that any domain may have a total of six channels maximum. The enhanced virtual interface configuration would be as shown in FIG. 1. As shown in FIG. 1, interfaces 5/0/0 and 5/0/1 can be configured to be virtual interfaces with two fixed upstream channels and four floating upstream channels. Thus, each interface may be allowed to have a maximum of six upstream channel ports, as long as the resources are available.

Assume further that each of the remaining interfaces (i.e., 5/0/2, 5/0/3, and 5/0/4) is left with its default setting. For example, each of these may have four fixed upstream channels. Accordingly, they cannot request for channels from the global pool. Since the number of fixed channels for interfaces 5/0/0 and 5/0/1 are two each, a total of four channels (i.e., two from each of interfaces 5/0/0 and 5/0/1) are made available to be assigned to the upstream resource pool. The floating channels may remain inactive unless and until physical channels are associated with them via a resource request.

Figure 2:
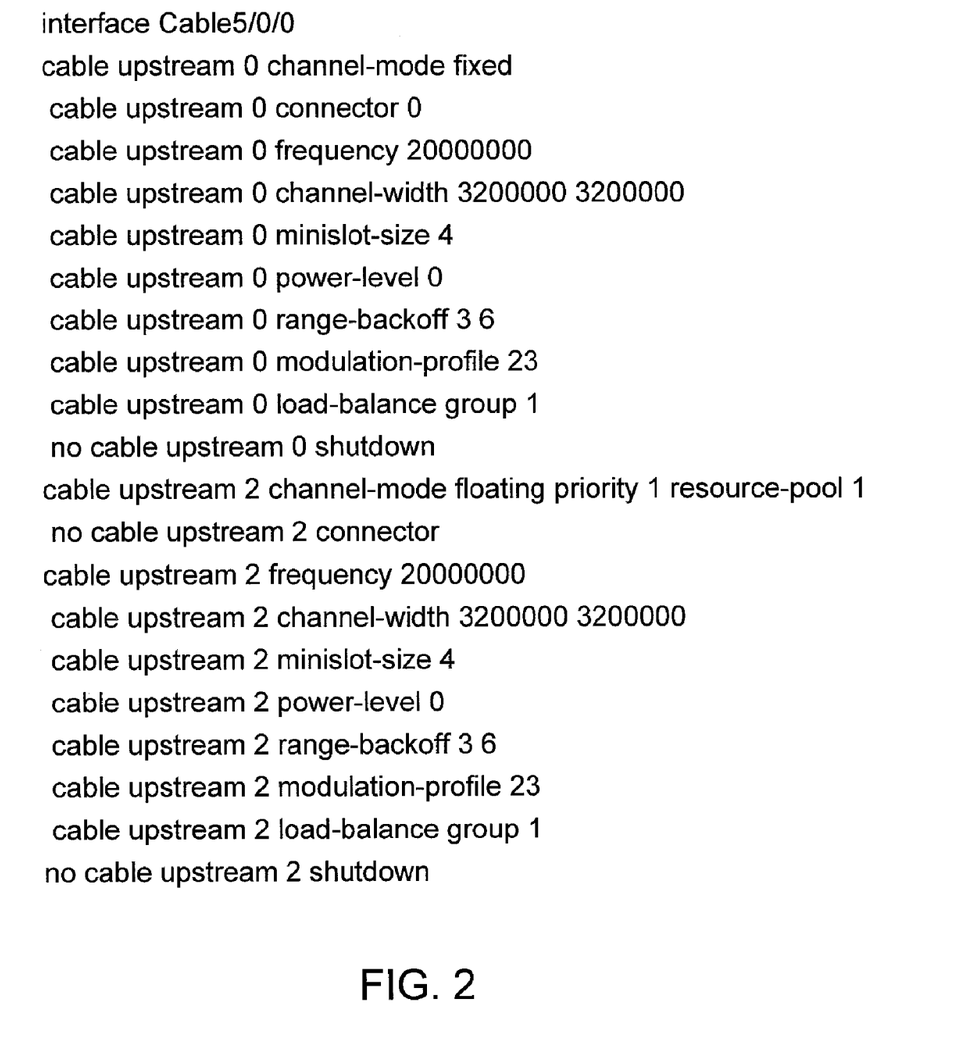
FIG. 2 provides an example pre-configuration of a plurality of fixed and floating channels.

The floating channels may be pre-configured so that all relevant upstream channel characteristics can be defined. Thus, as soon as a physical channel resource is tied to a floating channel, the channel may become operational. FIG. 2 shows how the floating channels can be pre-configured.

Figure 3:
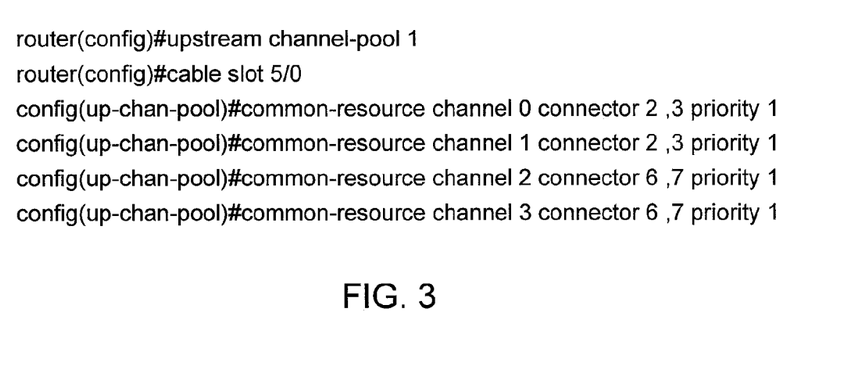
FIG. 3 provides an example configuration of an upstream resource pool.

The main enhancements defined by such a pre-configuration are channel mode and floating channel priority. As long as a floating channel is inactive, it need not be associated with an upstream connector. Also, in the example of FIG. 2, upstream channel 2, which is a floating channel, can request resources only from "upstream resource pool 1." An "upstream resource pool" can be configured as shown in FIG. 3.

It should be understood that the example shown takes into consideration the current 5×20S/U/H hardware design. Accordingly, channel resource allocation may be done on a per card basis. The CLI command is used to associate a channel pool to a particular cable line card. One or more channel pools can be defined for a given cable line card.

As shown, the connector statement may point to one of the two free connectors. Thus, the channel may be tied up with the appropriate connector depending upon the virtual interface to which the channel is going to be connected.

With the current design of 5×20 line cards (S, U, and H), two physical upstream channels share one physical layer ("PHY") chip. Accordingly, each pair can be tied to two adjacent connectors separately, or they can be frequency-stacked to one of the two adjacent connectors. For example, by default, upstream channel 0 of the first cable interface may be assigned to connector 0, and upstream channel 1 assigned to connector 1. However, both channels can be frequency-stacked to either connector 0 or connector 1.

In the example described herein, the default upstream channels corresponding to connectors 2 and 3 from cable 5/0/0 have been made available for the pool, as have the default upstream channels corresponding to connectors 6 and 7 from cable 5/0/1. With proper combining on the RF side, these four channels can be shared in any combination between cable interface 5/0/0 and cable interface 5/0/1.

Figure 4:
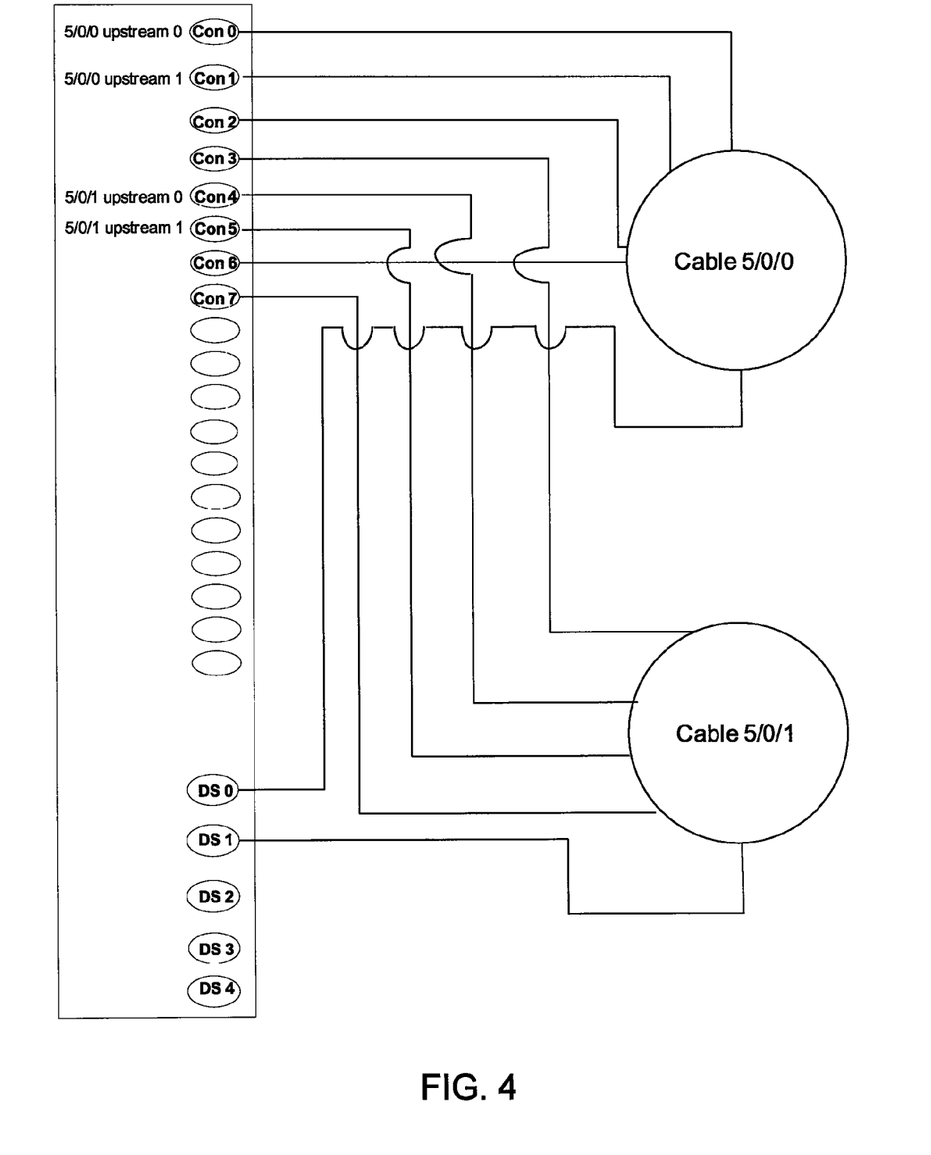
FIG. 4 provides an example of RF-combining.

An example of RF-combining is shown in FIG. 4. A dense mode RF plant configuration is assumed. Since this concept requires the US load balancing feature to be enabled, dense mode cabling may ensure optimized resource allocation and available bandwidth sharing.

As shown in FIG. 4, the RF domain for cable interface 5/0/0 may be cabled with upstream connectors con 0, con 1, con 2, and con 6. The RF domain for cable interface 5/0/1 may be cabled with upstream connectors con 3, con 4, con 5 and con 7.

With reference to the upstream resource pool configuration provided in FIG. 3, if cable interface 5/0/0 succeeds in reserving "common-resource channel 0," it will be tied to connector 2. Similarly, if cable interface 5/0/1 succeeds in reserving "common-resource channel 0," it will be tied to connector 3. Also, if cable interface 5/0/0 succeeds in reserving common-resource channels 0 and 1, both of them will be frequency stacked to connector 2. And if cable interface 5/0/1 succeeds in reserving common-resource channels 0 and 1, both of them will be frequency stacked to connector 3. If cable interface 5/0/0 succeeds in reserving all four of the resource channels, the channels will be frequency stacked on connectors 2 and 6.

In this manner, all four channels can be allocated in any combination to the cable interfaces 5/0/0 and 5/0/1 based on the priority settings and the dynamic channel allocation algorithm as described below. When an "upstream channel-pool" is created, each physical resource channel is associated with a priority value ranging from 1 to 10, where the lower the numeric value, the higher the priority. Which floating channel is selected in response to a channel allocation request may be based on the priority setting. The higher the priority setting, the better the chance of getting a resource channel allocated to a floating channel.

Dynamic Channel Allocation

An example system may include two main logical components: On Demand Channel (ODC) Controllers and b) ODC clients. An "upstream channel pool" may have an associated ODC controller. A virtual interface with one or more floating upstream channels may have an associated ODC client. Dynamic upstream load balancing may be enabled on the virtual interfaces. The ODC client may monitor (e.g., by periodically checking) the aggregate resource usage of the currently active channels.

Figure 5:
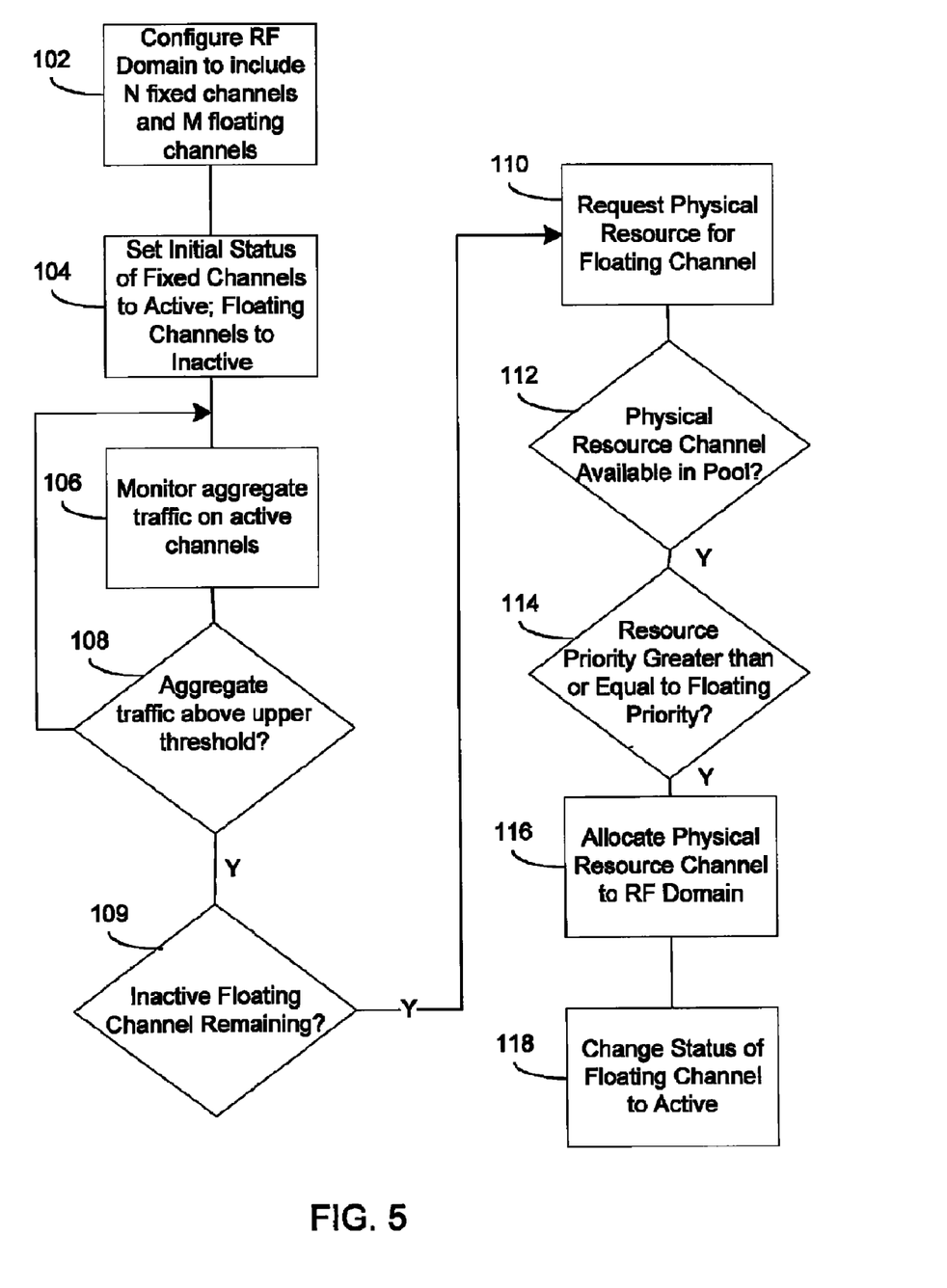
FIG. 5 is a flowchart of an example method for activating a floating channel.

FIG. 5 is a flowchart of an example method for activating a floating channel. At 102, each RF domain may be configured with a first number, N, of fixed channels, and a second number, M, of floating channels, as described above. At 104, the initial status of each fixed channel is set to active, and the initial status of each floating channel is set to inactive. Utilization-based dynamic load balancing will continuously try to balance the load among the fixed upstream channels.

For example, with reference once again to the example scenario described above, assume that cable 5/0/0 initially has only two active upstream channels, e.g., upstream 0 and upstream 1. Utilization-based dynamic load balancing will continuously try to balance the load between these two upstream channels.

At 104, the ODC client monitors the aggregate traffic on the active channels. At 106, the ODC client determines whether the aggregate traffic on the active channels exceeds a threshold. For example, assume that the ODC client is configured with an aggregate upstream channel threshold of, say, 75% utilization. In order for the ODC client to request an additional upstream channel resource, the aggregate upstream channel utilization for the currently active channels may need to be greater than this threshold for a finite number of utilization checks. Assume that the ODC client checks the aggregate utilization every 10 minutes. Thus, if six consecutive checks show that aggregate throughput is consistently at or above 75% then the ODC client will be eligible to request an additional channel.

If, at 106, the ODC client determines that the aggregate traffic on the active channels exceeds the threshold, then, at 108, the ODC client determines whether any inactive floating channels are available in the RF domain (i.e., the ODC client determines whether all the channels are currently active, which would indicate that all the floating channels have already been activated). If, at 108, the ODC client determines that at least one inactive floating channel is available in the RF domain, then, at 110, the ODC client sends a resource allocation request to the ODC controller.

When a floating channel is created, it may be associated with a respective priority. Also, it may be linked to the "upstream channel pool" from which resource channels can be requested. In an example embodiment, priority can have a numeric value in a range from, say, 1 to 10. In one embodiment, higher integer values may correspond to lower priorities. For example, a floating channel assigned a priority of 1 may have a higher priority than a floating channel assigned a priority of 2. A plurality of floating channels associated with a given virtual interface may be configured with different priority values.

When a resource allocation request comes in from one of the ODC clients, the ODC controller for the corresponding upstream channel pool may determine, at 112, whether any channels are available in the pool. If there are channels available in the pool, then, at 114, the ODC controller may compare the floating channel priority value with the priority value configured on the physical resource channels. At 116, the ODC controller may allocate any available channel for which the assigned priority is equal to or lower than the priority of the floating channel. When the channel resource is granted, the controller may inform the client about which physical connector it has to assign the channel. Also, the channel may be allocated for a fixed duration or it can be allocated for an unspecified duration. Duration can be provided as a configuration option.

Once a physical channel is associated with a floating upstream channel, the status of the floating channel may be changed to active at 118. The ODC client may inform the load balancing module about the availability of the new US channel. The load balancing module may include the new channel in the load balancing group so that modems can be moved from the other channels to balance the load. Existing load balancing algorithms can move one modem per second when an imbalance in load is detected. However, this can be enhanced to make the modem transfer more aggressive so as to optimize the usage of the new channel.

Figure 6:
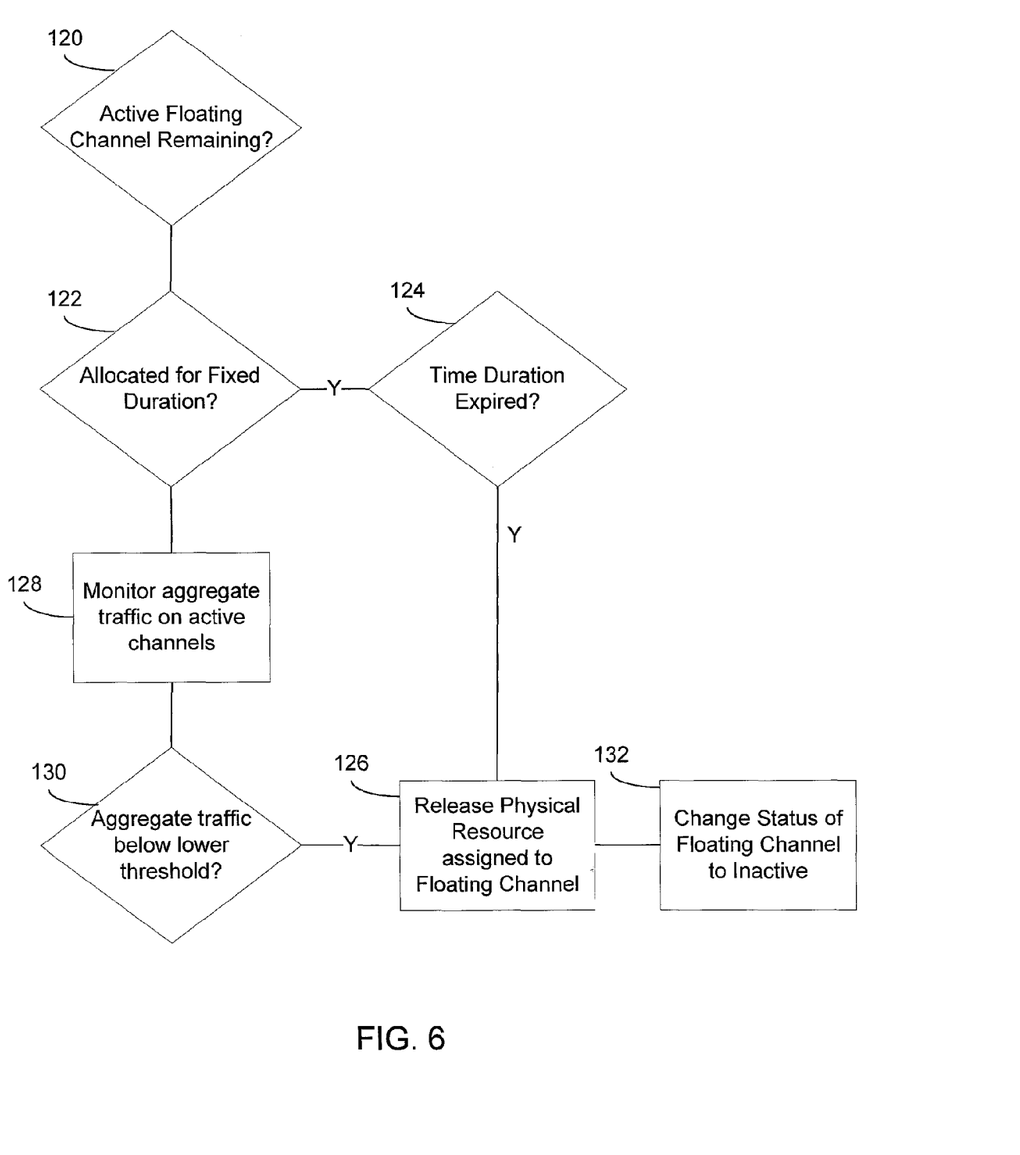
FIG. 6 is a flowchart of an example method for de-activating a floating channel.

FIG. 6 is a flowchart of an example method for de-activating a floating channel. As long as the ODC client determines, at 120, that there is an active floating channel in the RF domain, then the ODC client considers whether the allocated physical resource channel should be released. For example, if the ODC client determines, at 122, that the channel was assigned for a limited period of time, and, at 124, that the time duration has expired, then, at 126, the channel may be released when the allocated time period is about to expire.

Where the channel was assigned for a limited period of time, the ODC client may request renewal of the reservation, if the client thinks that it may be desirable to keep the acquired channel for some more time to account for the high bandwidth requirements. In that case, the ODC client may have to do the renewal request well before the lease expires. For example, if the channel was allocated for a duration of ten hours, the ODC client may be required to request renewal after the elapse of eight hours. That way, if the renewal is not approved, the client will have enough time to move the modems out of the channel that will need to be released. If the ODC channel fails to release the channel after the expiration, the ODC controller may force the channel out from the virtual interface.

If the ODC client determines, at 122, that the channel was assigned for an unspecified period of time, then the channel may be released when the ODC client determines that the dynamically acquired channel is no longer required based on the periodic utilization checks. For example, at 128, the ODC may continue to monitor the aggregate traffic on the active channels (which would now include the dynamically acquired channel). If, at 130, the ODC client determines that the aggregate utilization has stayed below a channel release cut off threshold for a finite number of checks, then, at 126, the ODC client may initiate the channel release.

If a channel is to be released, then the modem(s) from that channel should be moved gracefully back to the remaining active channels, to ensure that there is little or no disruption to service. An enhancement to an existing load balancing algorithm can be used to accomplish this. After the physical resource channel is released, then, at 132, the status of the floating channel to which it was assigned may be changed back to inactive.

It is possible for an ODC client corresponding to a virtual interface to request more than one resource channel, up to the maximum number of floating channels configured. However, carefully assigned priority numbers may ensure that one ODC client does not monopolize resource channel usage.

When a resource request is made by an ODC client, if there are no channels available meeting the priority criteria, the request can be placed in a waiting list for a finite duration. This waiting list could accommodate any number, n, of such requests. When there is a new channel resource made available, the request with the highest priority may get the channel allotted, as long as the priority value of the newly available resource channel is less than or equal to that of the request priority.

If a channel assignment is done for a limited duration and the ODC client decides to request a renewal, the client may or may not get the lease renewed. Assume that the client requests renewal of a resource channel that has a priority P. If the waiting list is empty, then the controller may approve the renewal. If the waiting list is not empty, are there is any pending request with a priority equal to or higher than P, then renewal request may be denied. If the waiting list is not empty, and all pending request priorities are lower than P, then the controller may approve the renewal.

Figure 7:
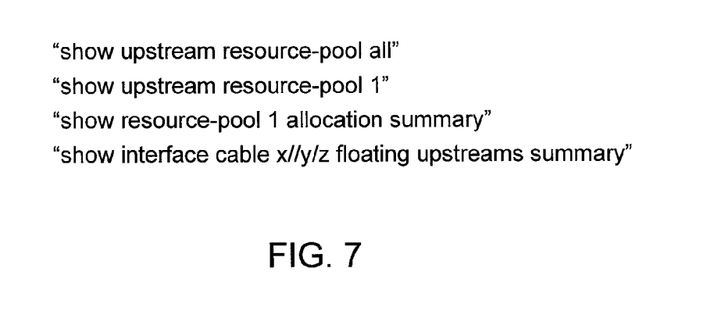
FIG. 7 provides example show commands for monitoring resource allocation.

Show commands may be employed to monitor the resource allocation. Examples of such commands are provided in FIG. 7.

It should be understood that, although the example scenario described herein is directed to dynamic channel addition for only two interfaces, the principles of the invention can be expanded to any number of RF domains, by carefully designing the RF side cabling, and also taking into consideration the connector side limitations.

What is claimed:

1. A method comprising:
configuring a first radiofrequency (RF) domain with a first number of fixed upstream channels and a second number of floating upstream channels;
configuring a second RF domain with a third number of fixed upstream channels and a fourth number of floating upstream channels;
associating an upstream resource pool to a respective physical resource channel associated with each of the first and second RF domains, wherein a selected one of the floating upstream channels is provided with a selected physical resource channel from the upstream resource pool for a limited time based on a current bandwidth requirement, and wherein when the time period ends the selected physical resource channel is released back to the upstream resource pool and a selected floating upstream channel is transitioned back to an inactive status; and
allocating to the first RF domain a physical resource channel from the upstream resource pool.

2. The method of claim 1, further comprising:
setting a respective initial status of each of the fixed channels to active and a respective initial status of each of the floating channels to inactive.

3. The method of claim 2, further comprising:
monitoring aggregate traffic on the active channels of the first RF domain;
determining whether the aggregate traffic has exceeded a threshold; and
if the aggregate traffic has exceeded the threshold, requesting allocation of a physical resource channel from the upstream resource pool to one of the floating channels of the first RF domain.

4. The method of claim 3, further comprising:
comparing a priority assigned to the floating channel with a priority assigned to the physical resource channel, and determining whether to allocate the physical resource channel to the first RF domain based on the comparison.

5. The method of claim 3, further comprising:
setting to active the status of the floating channel to which the physical resource has been allocated.

6. The method of claim 1, further comprising:
allocating the physical resource channel to the first RF domain for a fixed period of time; and
releasing the physical resource channel from first RF domain to the upstream resource pool.

7. The method of claim 1, further comprising:
allocating the physical resource channel to the first RF domain.

8. The method of claim 7, further comprising:
monitoring aggregate traffic on active channels of the first RF domain;
determining whether the aggregate traffic has fallen below a threshold; and
if the aggregate traffic has fallen below the threshold, releasing the physical resource channel from the first RF domain to the upstream resource pool.

9. The method of claim 8, further comprising:
setting to active the status of the floating channel to which the physical resource has been allocated.

10. A cable modem termination system, comprising:
a cable line card configured to have a first number of fixed channels and a second number of floating channels; and
an On Demand Channel (ODC) client that monitors traffic and requests allocation of a physical resource channel from an upstream resource pool to one of the floating channels, wherein a selected one of the floating channels is provided with a selected physical resource channel from the upstream resource pool for a limited time based on a current bandwidth requirement, and wherein when the time period ends the selected physical resource channel is released back to the upstream resource pool and a selected floating upstream channel is transitioned back to an inactive status.

11. The cable modem termination system of claim 10, wherein a respective floating channel priority is assigned to each of the floating channels, and a respective physical resource priority is assigned to each physical resource in the upstream resource pool.

12. The cable modem termination system of claim 11, further comprising:
an ODC controller that determines, based on a comparison between the floating channel priorities and the physical resource priorities whether a physical resource is available to be allocated to one of the floating channels.

13. The cable modem termination system of claim 12, wherein the ODC controller allocates a physical resource channel from the upstream channel pool to one of the floating channels if the physical resource priority is less than or equal to the floating channel priority of the floating channel.

14. The cable modem termination system of claim 10, wherein each of the fixed channels is allocated to a dedicated physical resource, and the floating channels are allocated to physical resources only in response to allocation requests.

15. The cable modem termination system of claim 10, wherein a physical resource channel allocated to one of the floating channels from the upstream channel pool is released to the pool after a predefined, fixed time duration has expired.

16. The cable modem termination system of claim 10, wherein a physical resource channel allocated to one of the floating channels from the upstream channel pool is released to the pool upon detection that aggregate traffic on active channels on the card, including traffic on active floating channels, has fallen below a threshold.

17. A method for dynamic allocation of upstream channel resources among multiple radiofrequency (RF) domains, the method comprising:
providing a first cable interface comprising a first number of physical resource channels;
providing a second cable interface comprising a second number of physical resource channels;
defining an upstream channel resource pool comprising physical resource channels from each of the first and second cable interfaces, wherein a floating channel is provided with a selected physical resource channel from the upstream channel resource pool for a limited time based on a current bandwidth requirement, and wherein when the time period ends the selected physical resource channel is released back to the upstream channel resource pool and the floating channel is transitioned back to an inactive status; and allocating the selected physical resource channel from the upstream channel resource pool to the first cable interface.

18. The method of claim 17, further comprising:

configuring the first cable interface to have a first number of fixed channels and a first number of floating channels;

configuring the second cable interface to have a second number of fixed channels and a second number of floating channels; and allocating the selected physical resource channel to one of the floating channels.

19. The method of claim 18, wherein the first number of fixed channels plus the first number of floating channels exceeds the first number of physical resource channels.

20. The method of claim 19, wherein the first number of fixed channels is less than the first number of physical resource channels, the second number of fixed channels is less than the second number of physical resource channels, and the upstream channel resource pool comprises at least one physical resource channel from each of the first and second cable interfaces that are not defined as fixed channels.

* * * * *